United States Patent
Ballesteros (10) Patent No.: US 8,424,959 B2
(45) Date of Patent: Apr. 23, 2013

(54) MOULD AND CROSS MEMBER ASSEMBLY, CROSS MEMBER AND MOTOR VEHICLE TECHNICAL FRONT PANEL

(75) Inventor: Fernando Ballesteros, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 18 days.

(21) Appl. No.: 12/810,703

(22) PCT Filed: Dec. 23, 2008

(86) PCT No.: PCT/FR2008/052409
§ 371 (c)(1),
(2), (4) Date: Oct. 8, 2010

(87) PCT Pub. No.: WO2009/081081
PCT Pub. Date: Jul. 2, 2009

(65) Prior Publication Data
US 2011/0025098 A1     Feb. 3, 2011

(30) Foreign Application Priority Data
Dec. 26, 2007   (FR) ...................................... 07 60369

(51) Int. Cl.
*B62D 21/00* (2006.01)
*B62D 25/00* (2006.01)
*B62D 25/08* (2006.01)
*B29C 45/26* (2006.01)
*B29C 70/72* (2006.01)

(52) U.S. Cl.
USPC ................. 296/193.09; 296/203.02; 425/117; 425/123; 425/470

(58) Field of Classification Search ............. 296/193.09, 296/203.02, 193.1, 197.09; 425/117, 470, 425/123
See application file for complete search history.

(56) References Cited

U.S. PATENT DOCUMENTS 5,897,823 A * 4/1999 Davis et al. ................... 264/266
6,106,261 A * 8/2000 von Holdt ..................... 425/130
(Continued)

FOREIGN PATENT DOCUMENTS

| DE | 10327769 A1 | 2/2005 |
| EP | 1849686 A1 | 10/2007 |
| JP | 56064458 | 6/1981 |
| JP | 2004168289 | 6/2004 |
| WO | 9922998 | 5/1999 |

OTHER PUBLICATIONS

English abstract of EP 1849686, Oct. 31, 2007.
(Continued)

*Primary Examiner* — Glenn Dayoan
*Assistant Examiner* — Sunsurraye Westbrook
(74) *Attorney, Agent, or Firm* — BCF LLP (57) ABSTRACT

The present invention relates to an assembly of a mold (14) and a motor vehicle cross-member (12), the cross-member including a portion for overmolding (20) that is designed to be placed in the mold, a portion that is designed to be situated outside the mold, and at least one reception zone (22, 24) for receiving a wall portion of the mold (26, 28), the reception zone being interposed between said two portions of the cross-member. The wall portion of the mold and the reception zone are essentially complementary in shape and the cross-member presents, in the reception zone, at least one offset (34, 36) relative to a reference surface following the general outline of the cross-member. The invention also provides a motor vehicle front panel that forms an overmolded part made using the above-defined assembly.

20 Claims, 3 Drawing Sheets

U.S. PATENT DOCUMENTS

| | | | |
|---|---|---|---|
| 6,189,958 B1 * | 2/2001 | Guyomard et al. | 296/193.09 |
| 6,416,866 B1 * | 7/2002 | Atake et al. | 428/424.8 |
| 7,001,659 B2 * | 2/2006 | Iriyama | 428/195.1 |
| 7,007,385 B2 * | 3/2006 | Tarahomi | 29/897.2 |
| 7,008,008 B2 * | 3/2006 | Andre et al. | 296/203.02 |
| 7,073,848 B2 * | 7/2006 | Lee | 296/193.09 |
| 7,144,073 B2 * | 12/2006 | Uchida | 296/203.02 |
| 2003/0152745 A1 | 8/2003 | Wagenblast | |

OTHER PUBLICATIONS

International Search Report of PCT/FR2008/052409, Jul. 2, 2009, Philipp Lanz.
English abstract of JP 2004168289, Jun. 17, 2004.
English abstract of JP 56064458, Jun. 1, 1981.
English abstract of DE 10327769, Feb. 10, 2005.

* cited by examiner

MOULD AND CROSS MEMBER ASSEMBLY, CROSS MEMBER AND MOTOR VEHICLE TECHNICAL FRONT PANEL

CROSS-REFERENCE TO RELATED APPLICATIONS

The present application is the United States National Stage of PCT/FR2008/052409 filed Dec. 23, 2008. The present application claims the benefit of priority to French patent application no. 07 60369 filed Dec. 26, 2007. Both of these applications are incorporated herein by reference.

FIELD OF THE INVENTION

The present invention relates to the technical field of structural and semi-structural parts for motor vehicles, and particularly but not exclusively to motor vehicle front panels.

BACKGROUND OF THE INVENTION

An overmolded motor vehicle front panel is already known, e.g. from patent FR 2 719 014 filed in the name of the Applicant, and comprising a metal cross-member having each of its ends inserted in a mold so that a portion of the cross-member projects from the mold, with the cross-member having plastics materials overmolded thereon in order to form support parts for headlight units.

Under such circumstances, the mold is sealed by a portion of the wall of the mold co-operating with the cross-member. It has been found that the mold is then not sealed in satisfactory manner. The cross-member forms an integral portion of the overmolded part that is obtained and must therefore not be subjected to excessive pressure in order to avoid damaging it.

When the sealing is not satisfactory, the plastics material delivered under pressure to the inside of the mold tends to escape towards the outside of the mold, in particular while the pressure inside the mold is high, e.g. during the stage of compacting the molding by injection.

Leaks of material to the outside of the mold degrade the quality of the overmolded part.

OBJECT AND SUMMARY OF THE INVENTION

An object of the invention is to remedy that drawback.

To this end, the invention provides an assembly of a mold and a motor vehicle cross-member, wherein the cross-member includes a portion for overmolding that is designed to be placed in the mold, a portion that is designed to be situated outside the mold, and at least one reception zone for receiving a wall portion of the mold, the reception zone being interposed between the two portions of the cross-member. The wall portion of the mold and the reception zone are essentially complementary in shape, and in the reception zone the cross-member presents at least one offset, and preferably at least two offsets, relative to a reference surface following the general outline of the cross-member.

The term "portion designed to be situated outside the mold" is used to mean a portion that is not designed to be inside a molding chamber of the mold. Nevertheless, this portion need not be literately outside the mold, it might be found for example in a vacuum chamber thereof, as applies in the example shown in FIG. 1.

The wall portion of the mold is essentially complementary to the reception zone, which means that when the reception zone presents a given offset, the wall portion of the mold presents an offset facing the offset of the reception zone, with at least some of the offsets of the cross-member possibly presenting an angle of inclination that differs from the angle of inclination of the corresponding offset of the mold.

The "reference surface" follows the general outline of the cross-member, which means that it ignores local variations in its shape.

In order to assess the "offset relative to the reference surface" between two points, the level of each of the two points is measured relative to a direction that is normal to the reference surface at each of said points, and then the difference is calculated between the two levels. If the difference is non-zero, then there exists an "offset relative to the reference surface" between the two points. For example, if the reference surface is plane, the levels of two points are measured along a direction normal to said surface. In contrast, if the reference surface has some other shape, e.g. if it is spherical, the level of a given point is measured relative to the reference surface along a direction that is normal to a plane that is tangential to the reference surface at that point.

It is found that numerous head losses occur along the passage followed by the material under pressure as it travels between the wall portion of the mold and the reception zone of the cross-member, because of friction between the material and the solid surfaces defining the passage and because of the turbulence that occurs at the limits of the flow of material. These phenomena are greatly intensified by the narrowness of the passage, and head losses are greater inside the passage than once the plastics material is outside the mold.

The offsets in the reception zone thus make it possible, for a given width of mold wall, to lengthen the path that needs to be followed by the material in order to escape from the mold, thereby making it possible to increase the head losses suffered by the leaking material.

In addition, the bends formed in the passage as a result of the offsets give rise to additional head losses.

Thus, the invention makes it possible to greatly reduce the speed of the plastics material escaping from the mold by lengthening the path of the plastics material and by disturbing it with changes of direction in the passage that is formed between the wall of the mold and the cross-member.

This makes it possible to reduce the volume of the leaks of material and as a result to control molding better, and thereby increase the quality of the shapes of the parts that are fabricated.

This also makes it possible to reduce the costs of fabricating the part that result from overmolding, since the quantity of material used for molding a part of given size is reduced by means of the invention.

The assembly of the invention also includes one or more of the characteristics in the following list:

At least one offset is formed with a projection or a cavity extending continuously around the cross-member. Thus, this offset is relatively easy to fabricate. In addition, the path of the mold material is lengthened without discontinuity over the entire outline of the cross-member, thereby diminishing losses of material in uniform manner. Preferably, each reception zone for receiving a wall portion of the mold includes at least one projection or at least one cavity. Each projection or cavity has two offsets, so each reception zone likewise has two offsets. Two reception zones of the mold wall are different from each other when they are spaced apart by a portion of the cross-member that is for overmolding. The path followed by the material to escape from the mold is therefore further lengthened, and less material leaks out from the molding chamber;

The projection or the cavity is situated at a distance from a longitudinal end of the cross-member;

The projection or the cavity is of transverse dimensions, measured in the longitudinal direction of the cross-member that are least ten times smaller than the longitudinal dimensions of the cross-member;

The cross-member presents at least one offset at the margin of the reception zone. The mold and the cross-member are essentially complementary in shape, which makes it possible to increase the length of the path along which the material travels without significantly changing the shape of the mold wall;

The cross-member is made of a thermosetting material, in particular of advanced molding compound (AMC) or of sheet molding compound (SMC). Because of the way it is fabricated (by molding), this type of cross-member may be subject to variations in thickness. It is then necessary to make provision in advance for the variations in thickness of cross-members and to apply a mold closure pressure against the cross-member at a value that is calculated to avoid damaging a cross-member of maximum thickness. This pressure value is applied by the mold to all of the cross-members, even those that are not so thick, where a higher pressure could have been applied without damage. Thus, even if a pressure value exists that will ensure that the mold is leaktight and at which the thickest cross-member is not damaged, this value does not ensure leaktightness for all parts. The invention thus serves to improve sealing between the mold and thermosetting material parts of all thicknesses;

The wall portion of the mold presents an offset facing the offset of the cross-member, with the offsets of the mold and of the cross-member presenting a difference in angle of inclination that is not zero. This enables the mold to be able to bear against the cross-member even when it is not as thick as the cross-member for which the mold was designed;

The cross-member presents a plurality of offsets, each formed in one or the other of the reception zones, and having slopes that are substantially constant and parallel to one another, each of these slopes preferably being parallel to an unmolding direction of the mold. In this context, it is considered that slopes are substantially parallel when they present a difference in angle of inclination of the order of a draft angle enabling unmolding from the mold, i.e. a difference of angle of inclination that is less than 2°. Thus, if a small variation in thickness occurs between two cross-members during fabrication thereof, this parallel arrangement of slopes serves to improve sealing between the mold and the thinnest cross-member. The mold must enable an element of constant outside shape to be overmolded on the cross-member, and must therefore be positioned on the thinnest cross-member in such a manner as to be further away from the portion for overmolding than when the mold is positioned on a thicker cross-member. If a cross-member has two slopes that are spaced apart by a given spacing and that form between them an angle that is not zero, then the mold can come into intimate contact with one of the two slopes without nevertheless reaching the bottom of said slope. The wall of the mold is thus spaced apart from the other slope by the given spacing plus the length due to the inclination of the two slopes over the height of these slopes that is not covered by the mold (see FIGS. 7A and 7B). The mold therefore cannot come into intimate contact with the second slope, and the additional space left between the wall of the mold and the second slope reduces the head losses that occur in the plastics material escaping from the mold. In contrast, if the two slopes are parallel, then the space between the two slopes is constant and the wall of the mold comes into intimate contact with both slopes, even when different cross-members present variations in thickness (see FIGS. 8A and 8B). This characteristic makes it possible to conserve satisfactory leaktightness during overmolding, even when there are variations in thickness;

The cross-member forms part of a motor vehicle front panel and preferably forms a beam of said front panel. Optionally, the mold is shaped to form at least one upright on the cross-member, the upright extending essentially perpendicularly to the cross-member, and the mold is preferably shaped to form two uprights that are spaced apart and essentially parallel to each other. The two uprights may be connected together by another cross-member, referred to as the bottom cross-member, extending parallel to the cross-member that acts as an insert. The mold may also be shaped to form on the upright at least one lateral arm that extends parallel to one end of the cross-member in its longitudinal dimension, said arm possibly serving as a mount for a headlight unit or for other accessories;

The reception zone of the cross-member and the wall portion of the mold are shaped so that the interface between the mold and the cross-member in the reception zone is of some minimum length that is longer than the length that a stream of material escaping from the mold is likely to travel during a molding cycle. For injecting molding, a "molding cycle" comprises the steps of injection and of compacting. Thus, the material does not escape from the mold, thereby achieving further savings in fabrication costs. In addition, since the materials do not escape from the mold, maintenance costs in the workshop in which the parts are fabricated are also reduced; and The reception zone of the cross-member and the wall portion of the mold are shaped so that a stream of plastics material escaping from the mold solidifies while it is in the reception zone. Solidification is the result of the material cooling and slowing down. Solidification of the plastics material serves to block completely the passage formed between the wall of the mold and the cross-member. Thus, the plastics material forms a gasket that ensures that the mold is completely leaktight. The sealing gasket serves to achieve further savings in material, and as a result to further reduce fabrication costs.

The invention also provides a cross-member of the assembly of the invention and a mold forming part of the assembly of the invention.

In addition, the invention also provides a motor vehicle front panel that comprises a cross-member, in particular forming a beam, together with at least one essentially vertical upright overmolded on the cross-member and extending downwards when the front panel is mounted on a motor vehicle, the upright being made of a plastics material and preferably of a thermoplastic material such as polypropylene, the upright and the cross-member each having a connection zone in which they are connected together, the cross-member including, in the connection zone, at least one offset relative to a reference surface following the general outline of the beam.

The offset is preferably covered in a fine layer of plastics material.

The front panel is an overmolded part fabricated using an assembly as defined above and comprising a cross-member and a mold.

The cross-member may have all of the technical characteristics described above.

In a particular embodiment, the front panel has two essentially vertical uprights that are spaced apart on the cross-member and that are connected together at their bottom ends by another cross-member, referred to as the bottom cross-member, and preferably molded integrally with the uprights.

Each of the uprights is designed to support at least one functional element, such as a headlight unit, and the bottom cross-member forms an impact beam. Thus, the front panel of the invention makes it possible, off the main assembly line, to assemble numerous elements of the front block.

The invention also provides an assembly of a mold and a set of two cross-members, each of the cross-members being in accordance with the invention, and at least one wall portion of the mold, and preferably each wall portion of the mold that is to be in register with a reception zone being of a shape that is essentially complementary to the corresponding reception zone of each of the two cross-members, one of the two cross-members including at least one portion that is of a shape that is different from a corresponding portion of the other one of the two cross-members.

Thus, even if both cross-members are different in order to enable two different parts to be formed, e.g. beams having different mechanical properties for a front panel, it is possible to overmold an identical shape on both cross-members using a single mold. By way of example, this is advantageous for a front panel for a motor vehicle platform in which the shape of the cross-member constituting a structural part of the vehicle may change depending on the model of the vehicle and depending on the mechanical properties desired therefor, while the molded portion may remain the same.

In addition, the spacing between the reception zones of each of the two cross-members is similar. This makes it possible to use the same mold, even when the insert-forming cross-member has a plurality of reception zones for receiving walls of the mold.

Advantageously, even when both cross-members of the set present different thicknesses, it is possible to use a single mold for forming the overmolded portion. This thickness of the cross-member is its dimension taken in the molding direction.

Each of the two cross-members presents a plurality of offsets, each formed in one or the other of its reception zones and having slopes that are substantially constant and mutually parallel, ignoring a draft angle. Thus, as explained above, during molding, the mold may be in intimate contact with all of the slopes of the reception zone, in spite of cross-members being of varying thicknesses, and it may thus be positioned on both cross-members in such a manner as to form an overmolded portion of constant thickness while providing leaktightness during overmolding, even if the two cross-members present variations in thickness.

BRIEF DESCRIPTION OF THE DRAWINGS

The invention can be better understood on reading the following description given purely by way of example and made with reference to the drawings, in which.

MORE DETAILED DESCRIPTION

Figure 1:
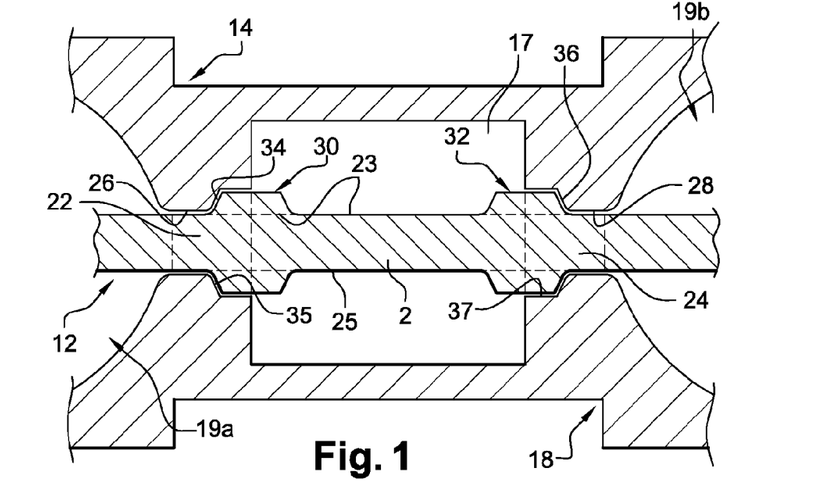
FIG. 1 is a diagrammatic section view showing a detail of an assembly comprising a mold and a cross-member in a particular embodiment of the invention, shown during an overmolding operation.

FIG. 1 shows an assembly 10 in a particular embodiment of the invention, the assembly comprising a cross-member 12 forming an insert and a mold 14 made up of two portions 16 and 18 serving to mold onto the cross-member 12 by injecting a plastics material, e.g. a thermoplastic material such as polypropylene. The cross-member 12 forms an open section member, e.g. a C- or U-shaped channel section or an L-shaped angle section, having a plurality of faces that are essentially plane. It is made of a thermosetting material such as AMC or SMC.

The cross-member 12 has a first portion 20 referred to as the portion for overmolding that is to be placed inside a molding chamber 17 of the mold, together with two reception zones 22 and 24 that are drawn in dashed lines, each of which is to receive a wall portion 26, 28 of the mold. Each reception zone 22, 24 is interposed between the portion for overmolding 20 and a portion that is to lie outside the molding chamber of the mold, and in the present example, that is to lie in a vacuum chamber 19a, 19b of the mold.

The cross-member 12 has two projections 30 and 32, each situated in part in the portion for overmolding 20 and in part in a reception zone 22, 24, at a distance from a longitudinal end of the cross-member. The two projections are of trapezoidal section, each having a top end that is plane and essentially parallel to a plane 23, defined by the face of the cross-member on which the projection is located, and two slopes extending on either side of the top end and connecting the top end to the panel 23, 25. They present transverse dimensions measured in the longitudinal direction of the cross-member that are at least ten times smaller than the longitudinal dimension of the cross-member. Each projection 30, 32 is arranged so that a slope 34, 36 of each projection, where it lies in each reception zone 22, 24, presents an offset relative to a reference surface following the general outline of the cross-member. The reference surface is drawn in chain-dotted lines in FIG. 1 and forms a rectangular parallelepiped including the planes 23 and 25. This reference surface ignores local variations in the thickness of the cross-member, such as the projections 30, 32.

Each wall portion 26, 28 of the mold is of a shape that is essentially complementary to the cross-member in the corresponding reception zone 22, 24 and thus likewise includes a slope 35, 37 situated facing the slope 34, 36. Each slope 35, 37 of the mold is at an angle of inclination that is slightly different from that of the corresponding offset 34, 36 of the cross-member so as to be capable of bearing against the cross-member regardless of its thickness.

The offset 34, 36 of the reception zone 22, 24 is situated at the margin of said zone 22, 24, thereby making it possible to avoid excessive modification to the shape of the mold wall.

The shapes of the cross-member 12 and of the mold 14 serve to lengthen the path to be followed by molten material under pressure seeking to escape from the mold via the gap that is situated between the cross-member and the wall of the mold. This serves to reduce the speed of the material and the quantity of material that is lost as a result of imperfect sealing at the interface between the cross-member and the mold, due in particular to the variations in thickness of the cross-member.

Figure 2:
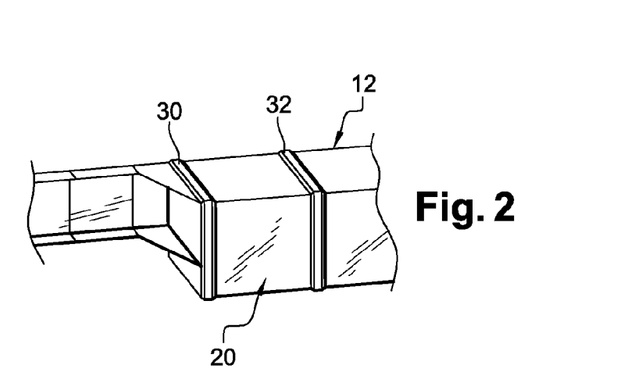
FIG. 2 is a perspective view of a detail of the cross-member shown in FIG. 1.

In FIG. 2, there can be seen the cross-member shown in perspective for its portion 20 for overmolding together with reception zones 22 and 24. In this figure, it can clearly be seen that each of the projections 30, 32 extends over the entire periphery of the cross-member.

Figure 3:
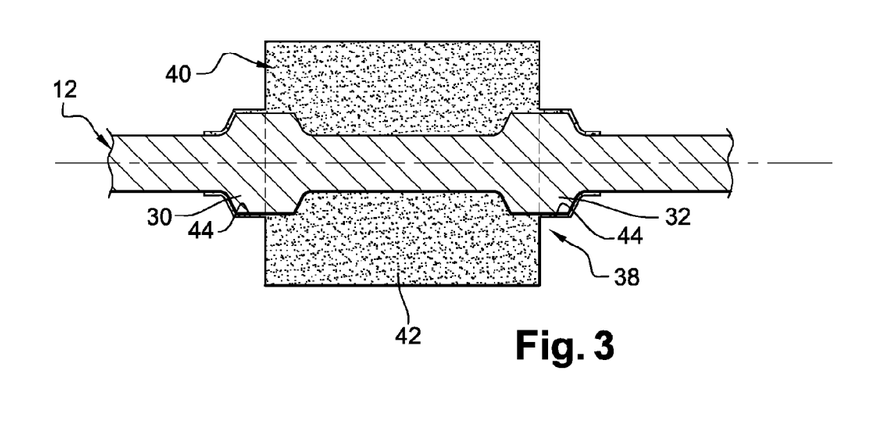
FIG. 3 is a section of an overmolded part obtained using the assembly of FIG. 1.

FIG. 3 shows a part including a cross-member 12 and obtained by overmolding plastics material onto the cross-member 12 as shown in FIG. 1. More particularly, there can be seen a connection zone 38 of the cross-member, in which the cross-member 12 is covered by the overmolded plastics material 40. It can be seen that the portion 40 has a central zone 42 of considerable thickness. This zone 42 corresponds to the material covering the overmolded portion of the cross-member and has a shape that corresponds to the shape of the inside of the molding chamber of the mold 14 shown in FIG. 1.

At the margin of the connection zone 38, the portion 40 also has zones 44 in which the overmolded material forms a film of material on the cross-member 12. The zones 44 cover a zone of the cross-member that corresponds to at least a portion of its reception zones 22, 24. The zones 44 correspond to the plastics material that solidifies while it is in the gap left between the wall portion of the mold and a reception zone of the cross-member.

Thus, each of the projections 30, 32 is covered in plastics material after overmolding. The cross-member 12 thus includes in its connection zone a plurality of offsets formed by the slopes 34, 36 of the projections 30, 32.

Figure 4:
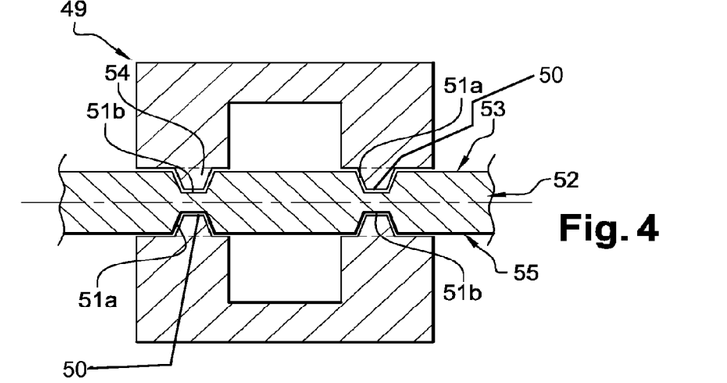
FIG. 4 shows a detail of an assembly of a cross-member and a mold in another embodiment of the invention.

In FIG. 4, there can be seen another assembly in another embodiment of the invention.

Two offsets in each reception zone of a wall portion of the mold 49 formed on the cross-member 52 are formed by a cavity 50 that extends continuously around the entire outline of the cross-member 52. Each cavity presents transverse dimensions, measured in the longitudinal direction of the cross-member, that are at least ten times smaller than the longitudinal dimension of the cross-member. Each cavity has a bottom 51b that is parallel to a plane 53, 55 defined by a corresponding face of the cross-member, and at each end of the cavity there is a corresponding slope 51a connecting the bottom 51b to the correspond plane 53 or 55. The corresponding wall portion of the mold 49 then has a projection 54 that is essentially complementary to the cavity 50 and that is designed to be placed in register with the cavity 50 during overmolding.

The cavity of the reception zone and the projection of the mold serve to form offsets relative to a reference surface drawn in chain-dotted lines in each of the figures and comprising the respective planes 53 and 55.

Figure 5:
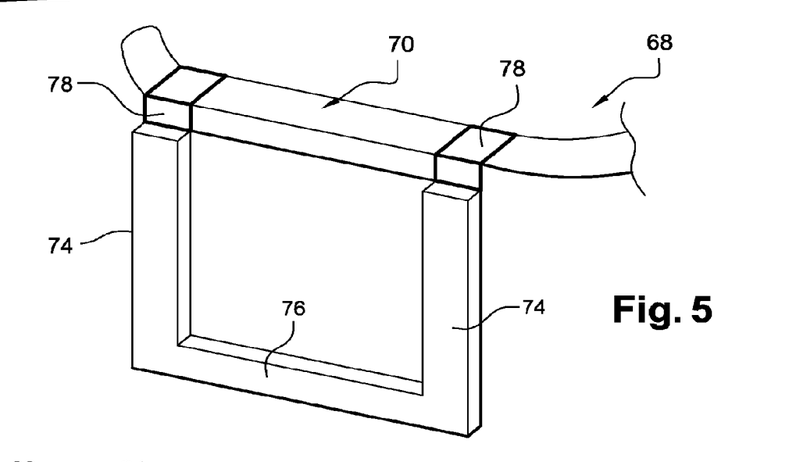
FIG. 5 is a perspective view of a front panel in a particular embodiment of the invention, the front panel forming an overmolded part.

FIG. 5 shows a motor vehicle front panel constituting a particular embodiment of the invention.

The front panel 68 has a cross-member 70 forming a top beam, two lateral uprights 72 and 74, and a bottom cross-member 76.

The cross-member 70 is made of a thermosetting material, such as AMC or SMC. It constitutes a structural part of the motor vehicle, and when mounted on the vehicle it is essentially horizontal with its longitudinal direction extending in the transverse direction of the vehicle.

The uprights 72 and 74 are spaced apart on the cross-member 70, and when they are mounted on a vehicle, they extend substantially vertically downwards. The uprights 72 and 74 serve to support functional elements of the vehicle, such as a headlight unit. At their bottom ends, these two uprights 72 and 74 are connected together by the bottom cross-member 76 that extends essentially parallel to the cross-member 70 and, once the front panel 68 is mounted in a vehicle, that forms a pedestrian impact beam, in particular a beam for preventing injury to pedestrians at knee level.

The front panel 68 is made as an overmolded part. The uprights 72 and 74 and the bottom cross-member are overmolded onto the cross-member 70. More particularly, the uprights 72 and 74 and the cross-member are made of an injected thermoplastic material, in particular polypropylene, and the cross-member 70 has connection zones 78 where it is connected to each of the uprights 72, 74. The connection zones of the cross-member are similar to those shown diagrammatically in FIG. 3.

Figure 6:
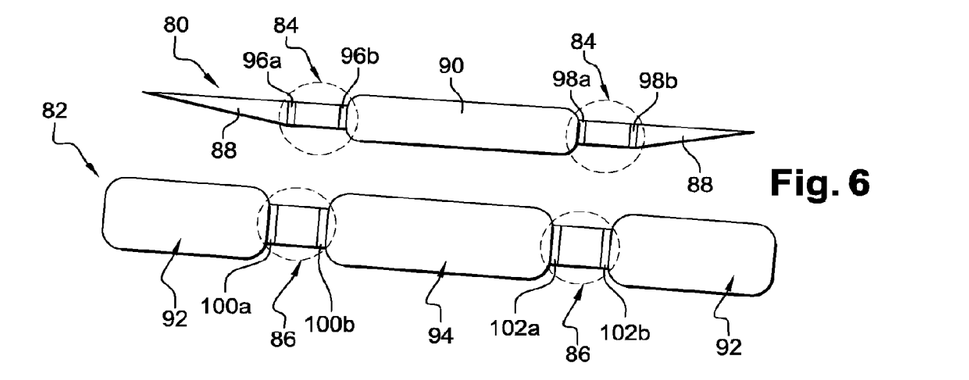
FIG. 6 is a diagrammatic front view of a set of two cross-members in a particular embodiment of the invention.

FIG. 6 is a diagram showing two cross-members 80 and 82 forming a motor vehicle front panel beam and suitable, for example, for being used with two different models of a common platform. Each of the cross-members has two portions for overmolding 84, 86 lying between projections 96, 98, 100, 102. The first cross-member 80 also has two portions 88 formed between the ends of the cross-member and the portion for overmolding nearest to said end, and an intermediate portion 90 extending between the two portions for overmolding 84 and 86. The second cross-member 82 likewise has two end portions 92 and an intermediate portion 94.

The end portions 88 and the intermediate portion 90 of the first cross-member 80 are of a shape that is different from the end portions 92 and the intermediate portion 94 respectively of the second cross-member 82.

In contrast, the portions for overmolding 84 and 86 and the projections 96, 100, and 98, 102 of the two cross-members 80, 82 are similar in shape. The spacings between the projections 96a, 96b, 98a, 98b of the first cross-member 80 are likewise similar to those of the projections 100a, 100b, 102a, 102b of the second cross-member 82. Thus, the reception zones of the two cross-members 80, 82 are suitable for receiving the same mold, which mold may be used to form uprights and a bottom cross-member that are identical on either of the two cross-members 80 and 82.

It is also possible to use the same mold when the two cross-members are not of the same thickness.

Figure 7A:
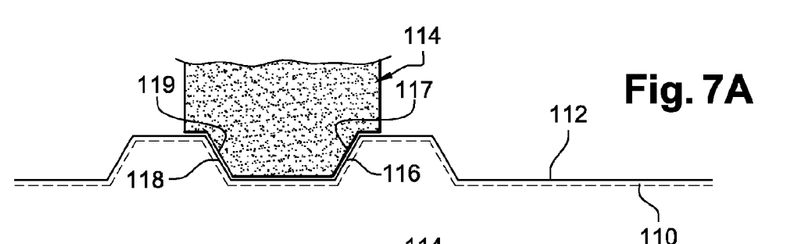
FIGS. 7A and 7B are diagrammatic views showing details of one wall of each of two cross-members together with a wall of a mold, the set of cross-members and the mold forming an assembly in an embodiment of the invention, the figures showing more particularly the positioning of the mold relative to each cross-member when the cross-members present different thicknesses.
Figure 7B:
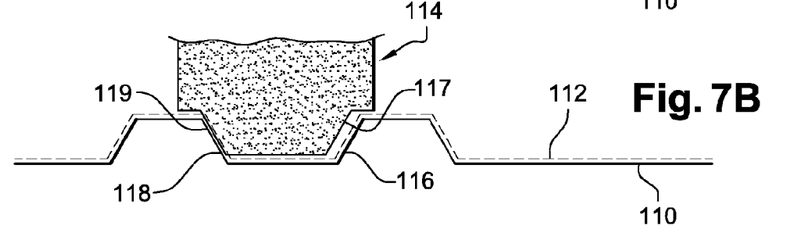

FIGS. 7A and 7B show a wall of a first cross-member 110 having a given thickness and a wall of a second cross-member 112 of greater thickness, having the same profile as the wall of the cross-member 110, at least in its reception zone for receiving a mold wall 114. These two cross-members are thus both capable of receiving a wall portion of the same mold 114.

With the thickest cross-member 112, the wall of the mold 114 is closer to the reception zone of the cross-member 112. In contrast, the same mold closes further away from the thinner cross-member 110.

Each reception zone of the cross-members 110, 112 presents two offsets 116, 118 formed by two spaced-apart projections, the slopes of the offsets 116 and 118 forming a non-zero angle relative to each other. The mold has offsets 117, 119 situated facing those of the cross-member, and having angles of inclination that are slightly smaller than the angles of inclination of the corresponding offsets of the cross-member, relative to a direction normal to a plane defined by a face of the cross-member, so as to enable the mold to bear against the thinnest cross-member 110. As can be seen in FIGS. 7A and 7B, the wall of the mold 114 comes into intimate contact with the cross-member 110 only on the slope 118.

Figure 8A:
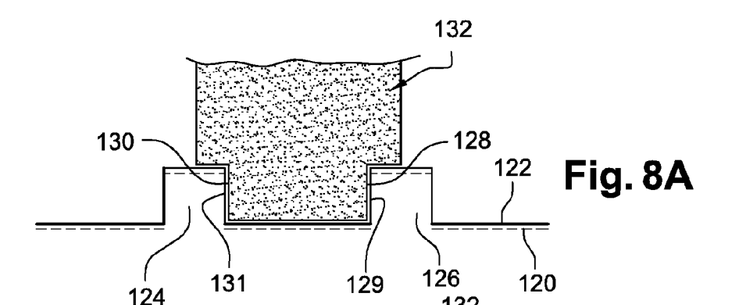
FIGS. 8A and 8B are diagrammatic views showing details of one wall of each of two cross-members together with a wall of a mold, the set of cross-members and the mold forming an assembly in another embodiment of the invention, the figures showing more particularly the positioning of the mold relative to each cross-member when the cross-members present different thicknesses.
Figure 8B:
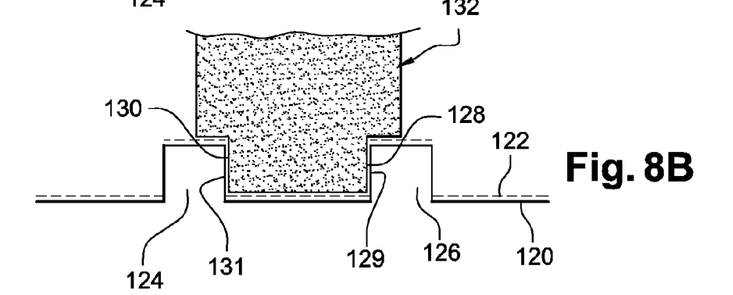

When there exists a variation in thickness between two cross-members, the embodiment shown in FIGS. 8A and 8B is more advantageous. In these figures, there can be seen a wall of each of two cross-members 120 and 122 in their reception zones, the cross-member 120 being thinner than the cross-member 122, with both of these cross-members presenting the same profile in the reception zone so that both of them are suitable for receiving a portion of the wall of the same mold 132.

Each of these cross-members presents two projections 124, 126 forming, at the margins of the reception zone, two offsets 128 and 130 of slopes that are substantially parallel and vertical. The mold has offsets 129, 131 situated facing each of those of the cross-member, and slightly inclined relative to the slopes of the offsets of the cross-members, so as to enable the mold to bear against the thinner cross-member 120.

Under such circumstances, when the wall of the mold 132 is put into place on the thinner cross-member 120, it still comes into intimate contact with the two slopes 128, 130 of the reception zone, thus making it possible to increase the head losses to which the material under pressure escaping from the mold is subjected.

Thus, the cross-member of the invention, in particular forming a motor vehicle front panel beam, serves to minimize losses of material during the overmolding operation on said part.

It is particularly advantageous for the cross-member and the mold to be shaped so that the interface between the mold and the cross-member in the reception zone is of some minimum length that is longer than a length that a stream of plastics material escaping from a mold is liable to travel during a molding cycle. The shape of the reception zone that enables this object to be achieved varies depending on the characteristics of the molding step. It may also be advantageous for the reception zone and the wall of the mold to be shaped so that a stream of plastics material escaping from the mold solidifies while it is in the reception zone. As a result, the solidified plastics material forms a gasket closing the gap lying between the mold and the cross-member. In both of these circumstances, the material is not suitable for escaping from the mold, thereby enabling the losses that it suffers to be further reduced.

In addition, the invention is not limited to the embodiment described above. For example, the number of offsets in the reception zone is not limited to two and the shapes of the offsets are not limited to those described. By way of example, the offsets need not be formed at the margins of the reception zone.

Furthermore, the offsets are not necessarily constituted by faces that are plane and of constant slope. They may be formed by surfaces having a profile that is sinusoidal or that bulges, for example, or by two adjacent plane faces having different angles of inclination. Furthermore, although not shown in the figures, the offsets may slope steeply relative to a direction normal to the face of the cross-member.

The difference in angle of inclination between the offsets of the mold and the offsets of the wall should be less than 45°, preferably less than 20°. By way of example, the reception zone may have a plurality of offsets, with only some of these offsets, in particular the offsets that are furthest from the molding chamber, presenting a difference in angle of inclination that is greater than 10° relative to the corresponding offsets of the mold.

Similarly, the shapes of the cross-member are not limited to those described. The materials described for the cross-member and for the overmolded portion, and the technique used for overmolding are likewise not limited to the above description.

The overmolded part may also form a support for a fender, a floor, or a structural portion of a tailgate or of a door, for example. Even if the overmolded portion forms a front panel, it may include, in addition to or as a replacement for the uprights, other overmolded elements such as side arms extending substantially perpendicularly to the uprights.

The invention claimed is:

1. An assembly of a mold and a motor vehicle cross-member, wherein the cross-member includes a portion for overmolding that is designed to be placed in the mold, a portion that is designed to be situated outside the mold, and at least one reception zone for receiving a wall portion of the mold, the reception zone being interposed between the two portions of the cross-member, the wall portion of the mold and the reception zone being essentially complementary in shape, the cross-member presenting, in the reception zone, at least one offset relative to a reference surface following the general outline of the cross-member.

2. An assembly according to claim 1, wherein at least one offset is formed with a projection or a cavity extending continuously around the cross-member.

3. An assembly according to claim 2, wherein the projection or the cavity is situated at a distance from a longitudinal end of the cross-member.

4. An assembly according to claim 1, wherein the cross-member presents at least one offset at the margin of the reception zone.

5. An assembly according to claim 1, wherein the cross-member is made of a thermosetting material.

6. An assembly according to claim 5, wherein the wall portion of the mold presents an offset facing the offset of the cross-member, with the offsets of the mold and of the cross-member presenting a difference in angle of inclination that is not zero.

7. An assembly according to claim 5, wherein the cross-member presents a plurality of offsets, each formed in one or the other of the reception zones, and having slopes that are substantially constant and parallel to one another.

8. An assembly according to claim 5, wherein the thermosetting material is AMC or SMC.

9. An assembly according to claim 7, wherein each of the slopes is parallel to an unmolding direction of the mold.

10. An assembly according to claim 1, wherein the cross-member forms part of a motor vehicle front panel.

11. An assembly according to claim 10, wherein the mold is shaped to form at least one upright on the cross-member and extending essentially perpendicular thereto.

12. An assembly according to claim 11, wherein the at least one upright is two uprights that are spaced apart and essentially parallel to each other.

13. An assembly according to claim 12, wherein the mold is shaped to form a bottom cross-member that is parallel to the cross-member connecting together the two uprights and that connects together the two uprights.

14. An assembly according to claim 10, wherein the cross-member forms a beam of said front panel.

15. A motor vehicle cross-member of an assembly according to claim 1.

16. An assembly of a mold and a set of two cross-members, each of the cross-members being in accordance with claim 15, wherein at least one wall portion of the mold is essentially complementary to corresponding reception zone of each of the two cross-members, one of the two cross-members including at least one portion of a shape that is different from a corresponding portion of the other one of the two cross-members.

17. A set of two cross-members forming part of the assembly of claim 16.

18. An assembly according to claim 16, wherein the at least one wall is each wall portion of the mold that is to face a reception zone.

19. A mold forming part of an assembly according to claim 1.

20. An assembly according to claim 1, wherein the at least one offset is at least two offsets.

* * * * *